United States Patent
Huang et al.

(10) Patent No.: US 9,420,218 B2
(45) Date of Patent: Aug. 16, 2016

(54) TELEVISION SYSTEM

(71) Applicant: MStar Semiconductor, Inc., Hsinchu Hsien (TW)

(72) Inventors: Ching-Chun Huang, Hsinchu County (TW); Ping-Chun Wang, Hsinchu County (TW); Chun-Chieh Chen, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/509,742

(22) Filed: Oct. 8, 2014

(65) Prior Publication Data
US 2015/0104143 A1    Apr. 16, 2015

(30) Foreign Application Priority Data
Oct. 11, 2013   (TW) .............................. 102136784 A

(51) Int. Cl.
| H04N 5/765 | (2006.01) |
| H04N 21/2747 | (2011.01) |
| H04N 21/433 | (2011.01) |
| H04N 21/4788 | (2011.01) |
| H04N 5/44 | (2011.01) |

(52) U.S. Cl.
CPC .............. *H04N 5/765* (2013.01); *H04N 5/4448* (2013.01); *H04N 21/2747* (2013.01); *H04N 21/4334* (2013.01); *H04N 21/4788* (2013.01)

(58) Field of Classification Search
None
See application file for complete search history.

(56) References Cited

U.S. PATENT DOCUMENTS

| 2006/0187362 A1* | 8/2006 | Uehara | ................. H04N 17/045 348/790 |
| 2012/0300043 A1* | 11/2012 | Urisu | .................. H04N 13/0029 348/51 |
| 2014/0282044 A1* | 9/2014 | Oztaskent | ............... G06F 3/033 715/740 |

FOREIGN PATENT DOCUMENTS

CN             101193221 A      6/2008

OTHER PUBLICATIONS

Taiwan Intellectual Property Office, "Office Action" issued on Aug. 27, 2015.

* cited by examiner

*Primary Examiner* — Eileen Adams
(74) *Attorney, Agent, or Firm* — WPAT, PC; Justin King; Jonathan Chiang

(57) ABSTRACT

A television system includes an image processing module, a display and an image capturing module. The image processing module and the image capturing module are integrated in a single chip. The image processing module performs an image processing procedure on an image input to generate an output image. The display plays the output image generated by the image processing module. In response to an image capturing instruction received, the image capturing module captures the input image or the output image.

15 Claims, 1 Drawing Sheet

TELEVISION SYSTEM

This application claims the benefit of Taiwan application Serial No. 102136784, filed Oct. 11, 2013, the subject matter of which is incorporated herein by reference.

BACKGROUND OF THE INVENTION

1. Field of the Invention

The invention relates in general to a television system, and more particularly, to a technology for capturing a television image.

2. Description of the Related Art

With the thriving development of various electronic products, sharing diversified information through a digital form is popular among general users. In current technologies, when a user wishes to capture, share, and store real-time television images, a peripheral hardware such as a video capture card is required. An alternative way to obtain television images is copying an image of a television screen with a camera; with however image quality of the obtained television images being quite unsatisfactory.

SUMMARY OF THE INVENTION

The invention is directed to a television system that internally integrates a capturing function, so as to increase the ease of use for capturing a television image and to yield a capturing result with good image quality at the same time.

According to an embodiment of the present invention, a television system is provided. The television system includes an image processing module, a display and an image capturing module. The image processing module and the image capturing module are integrated in a single chip. The image processing module performs an image processing procedure on an image input to generate an output image. The display plays the output image. In response to an image capturing instruction, the image capturing module captures the input image or the output image.

According to another embodiment of the present invention, a television chip that collaborates with a display is provided. The television chip includes an image processing module and an image capturing module. The image processing module performs an image processing procedure on an image input to generate an output image that is to be played by the display. In response to an image capturing instruction, the image capturing module captures the input image or the output image.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
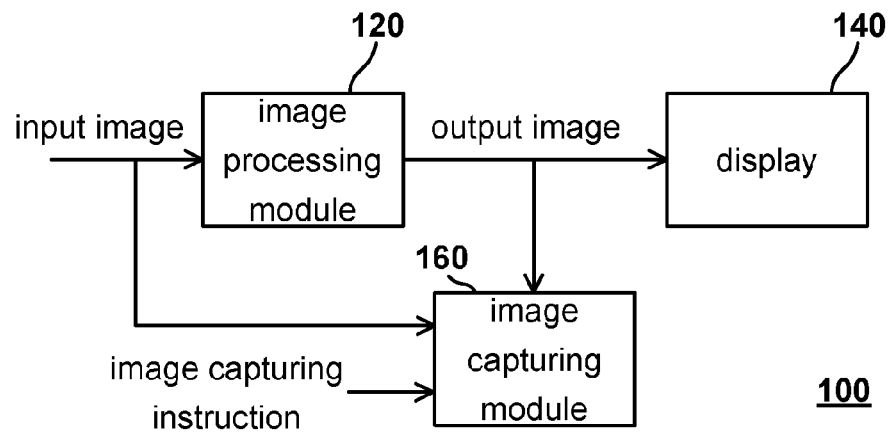
FIG. 1 is a block diagram of a television system according to an embodiment of the present invention.

FIG. 1 shows a block diagram of a television system according to an embodiment of the present invention. It should be noted that, the term "present invention" refers to inventive concepts described by the non-limiting embodiments.

Referring to FIG. 1, a television system 100 includes an image processing module 120, a display 140 and an image capturing module 160. The image processing module 120 performs an image processing procedure on an input image to generate an output image. For example, the input image is from a signal source such as a cable, a satellite antenna, a broadband network, a terrestrial broadcasting source or a multimedia player. For example, the image processing procedure performed by the image processing module 120 may include changing an image size, and adjusting an image brightness level, contrast and sharpness. For example, the image processing procedure may further include integrating multiple images, e.g., inserting on-screen display (OSD) information into an original program image. Alternatively, the image processing procedure may include adding user interaction information to the input image, e.g., adding MHEG-5-compliant interaction information. Next, the display 140 plays the output image generated by the image processing module 120.

The image capturing module 160 and the image processing module 120 are integrated in a single chip. In the embodiment, the image capturing module 160 is simultaneously coupled to an input end and an output end of the image processing module 120. That is, the image capturing module 160 may receive the input image provided to the input end of the processing module 120, and may also receive an output image generated by the image processing module 120. In response to an image capturing instruction received, the image capturing module 160 captures the output image to be played by the display 140 or an input image corresponding to the output image.

Since the image capturing module 160 is a part of the television system 100, a user can easily obtain images currently played by the display 140 without additionally hardware such as an image capture card. Further, unlike an external image capture card, as the image capturing module 160 and the image processing module 120 are integrated in a single chip, a source of images captured by the image capturing module 160 is more flexible. When the image captured by the image capturing module 160 is an image that the image processing module 120 provides to the display 140, a captured result is quite close or identical to the image that a user physically observes through the display 140. When the image captured by the image capturing module 160 is an input image that has not been adjusted by the image processing module 120, a captured result may be different from an image that a user observes through the display 140, e.g., OSD information in the image may be omitted.

In practice, the image processing module 120 may be a basic image processing module generally included in a television system chip. With the additional image capturing module 160, an effect equivalent to capturing an image that a user observes through the display 140 can be achieved. Apart from providing a captured result that is noticeably better than that provided by photographing a television screen, the increase in hardware costs is kept minimal. On the other hand, bounded by available technologies and hardware costs, current external image capture cards are incapable of capturing image signals having higher frequencies. In contrast, the image capturing module 160 of the present invention is not limited by such restriction.

Figure 2:
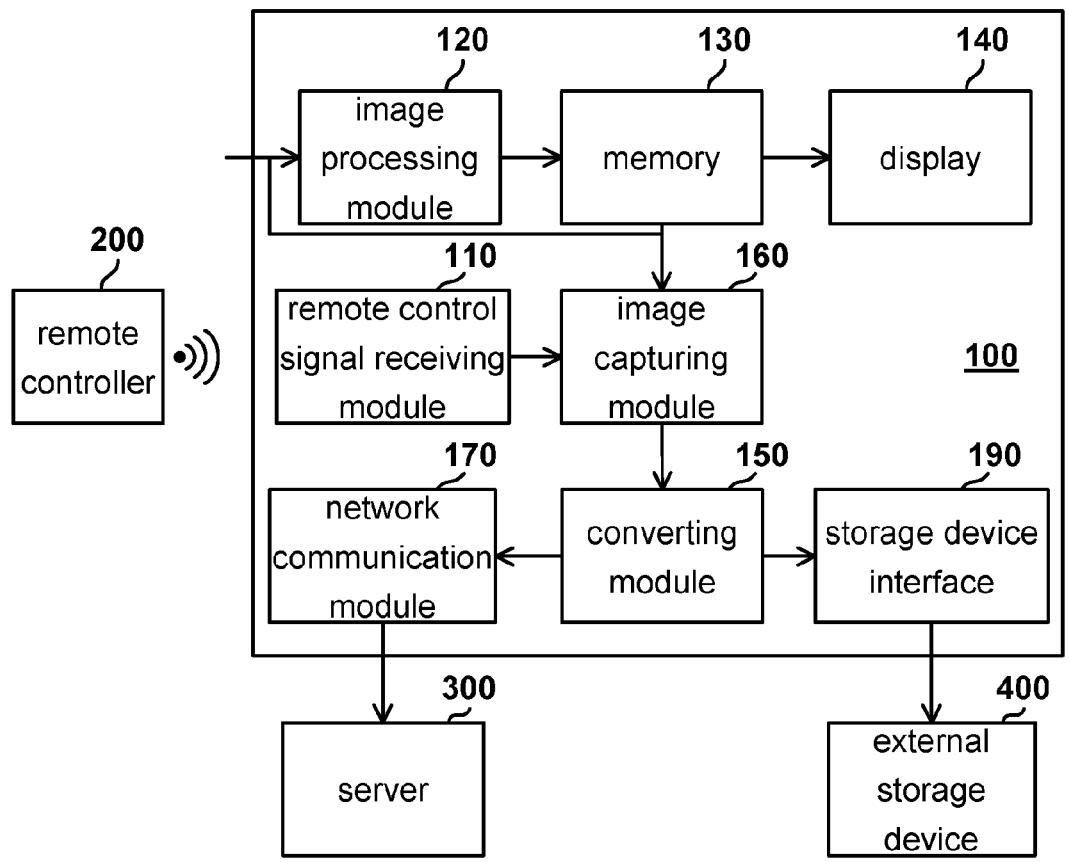
FIG. 2 is a block diagram of a television system according to another embodiment of the present invention.

FIG. 2 shows a block diagram of a television system 100 according to another embodiment of the present invention. Compared to FIG. 1, the television system 100 in FIG. 2 further includes a remote control signal receiving module 110, a memory 130, a converting module 150, a network communication module 170, and a storage device interface 190.

The remote control signal receiving module 110 receives an image capturing instruction sent from a remote controller 200, and provides the image capturing instruction to the image capturing module 160. In practice, the remote controller 200 may be provided with a corresponding key, which allows a user to control the television system 100 to capture image through the remote controller 200. In one embodiment, the image capturing instruction may be designed to prompt the image capturing module 160 to capture images from a fixed source (e.g., the output image of the image processing module 120). That is to say, when a user presses the image capturing key on the remote controller 200, the image capturing module 160 captures the output image of the image processing module 120. In another embodiment, the image capturing instruction may be designed to provide customized options. For example, when a user presses a key on the remote controller 200, the image capturing module 160 captures the output image of the image processing module 120; when a user presses another key on the remote controller 200, the image capturing module 160 captures the input image of the image processing module 120.

The memory 130 is coupled between the image processing module 120 and the display 140, and stores the output image to be played by the display 140. In this embodiment, the image capturing module 160 obtains the output image from the memory 130.

The converting module 150 converts the output image captured by the image capturing module 160 from a first format to a second format. For example, the converting module 150 supports color space conversion from an RGB color space to a YUV color space. Further, the signal that the image processing module 120 provides to the display 140 may be RGB grayscale values of individual pixels, and the converting module 150 is capable of converting the output image to a Joint Photographic Experts Group (JPEG) image or a Portable Network Graphics (PNG) image.

After the image capturing module 160 captures the output image, the output image may be transmitted to a server 300 through the network communication module 170 and a network connection (not shown). For example, the output image may be uploaded to servers of various social networks and be shared with other network users.

An external storage device 400 may connect to the television system 100 through the storage device interface 190. As such, the image capturing module 160 captures an output image, and transmits the output image to the external storage device 400. For example, the external storage device 400 may be a Universal Serial Bus (USB) portable disk or a Secure Digital (SD) card.

It should be noted that, the remote control signal receiving module 110, the memory 130, the converting module 150, the network communication module 170 and the storage device interface 190 may be independent devices. For example, without going through the converting module 150, the image capturing module 160 may also directly provides the output image captured to the network communication module 170 and/or the storage device interface 190.

The concepts of the present invention may also be applied to a chip in a television system. According to another embodiment of the present invention, a television chip for collaborating with a display is provided. The television chip includes an image processing module and an image capturing module. The image processing module performs an image processing procedure on an input signal to generate an output signal to be played by the display. The image capturing module, coupled to the image processing module, captures the input image or the output image in response to an image capturing instruction received. Variations and additional functions in the description associated with the television system 100 are applicable to the television chip, and shall be omitted herein.

In conclusion, the television system of the present invention, by integrating a capturing function in the television system, significantly increases the ease of use for capturing a television image and yields a capturing result with good image quality at the same time.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A television system, comprising:
a television, comprising:
an image processing module integrated into said television, configured to perform an image processing procedure on an input signal to generate an output image to be displayed on the television;
a display of said television, configured to play the output image; and
an image capturing module, integrated in a single chip and integrated into said television with the image processing module, coupled to an input end and an output end of the image processing module, for receiving an image capturing instruction to capture the input signal of the input end or the output image, and for selectively capturing one of the input signal and the output image in response to an image capturing instruction, wherein the image capturing module captures the input signal or the output image as a captured image and the captured image is an image file;
wherein, when the captured image is according to the output image, the captured image is a same image as an image to be displayed on the television.

2. The television system according to claim 1, wherein the image processing module adds on-screen display (OSD) information or user interaction information to the input signal to generate the output image.

3. The television system according to claim 1, further comprising:
a remote signal receiving module, configured to receive the image capturing instruction from a remote controller, and to provide the image capturing instruction to the image capturing module.

4. The television system according to claim 1, further comprising:
a memory, configured to store the output image to be played by the display;
wherein the image capturing module captures the output image from the memory.

5. The television system according to claim 1, further comprising:
a converting module, configured to convert the output image captured by the image capturing module from a first format to a second format.

6. The television system according to claim 1, further comprising:

a network communication module, configured to transmit the output image to a server through a network after the image capturing module captures the output image.

7. The television system according to claim 1, further comprising:
a storage device interface;
wherein when an external storage device connects to the television system through the storage device interface, the output image is transmitted to the external storage device after the image capturing module captures the output image.

8. A television chip, integrated in a television and cooperating with a display of the television, comprising:
an image processing module integrated into said television, configured to perform an image processing procedure on an input signal to generate an output image to be played by the display of the television; and
an image capturing module integrated into said television, coupled to the image processing module, coupled to an input end and an output end of the image processing module, for receiving an image capturing instruction to capture the input signal of the input end or the output image, and configured to selectively capture one of the input signal and the output image in response to an image capturing instruction, wherein the image capturing module captures the input signal or the output image as a captured image and the captured image is an image file;
wherein, when the captured image is according to the output image, the captured image is a same image as an image to be displayed on the television.

9. The television chip according to claim 8, wherein the image processing module adds OSD information or user interaction information to the input signal to generate the output image.

10. The television chip according to claim 8, further comprising:
a remote signal receiving module, configured to receive the image capturing instruction from a remote controller, and to provide the image capturing instruction to the image capturing module.

11. The television chip according to claim 8, further comprising:
a memory, configured to store the output image to be played by the display;
wherein the image capturing module captures the output image from the memory.

12. The television chip according to claim 8, further comprising:
a converting module, configured to convert the output image captured by the image capturing module from a first format to a second format.

13. The television chip according to claim 8, further comprising:
a network communication module, configured to transmit the output image to a server through a network after the image capturing module captures the output image.

14. The television chip according to claim 8, further comprising:
a storage device interface;
wherein, when an external storage device connects to the television system through the storage device interface, the output image is transmitted to the external storage device after the image capturing module captures the output image.

15. The television system according to claim 5, wherein the converting module converts the first format to a the second format using a conversion comprising converting from a first color space to a second color space, or converting from a first file type to a second file type.

* * * * *